Patented July 5, 1927.

1,634,980

UNITED STATES PATENT OFFICE.

LOUIS CLÉMENT AND CLÉRY RIVIÈRE, OF PANTIN, FRANCE, ASSIGNORS OF ONE-HALF TO COURTAULDS LIMITED, OF LONDON, ENGLAND.

MANUFACTURE AND PRODUCTION OF THREADS, FILAMENTS, STRIPS, OR FILMS FROM CELLULOSE ESTERS.

No Drawing. Application filed November 17, 1924, Serial No. 750,474, and in Great Britain January 5, 1924.

This invention consists in an improved process for the precipitation, or coagulation, of solutions of cellulose esters, for the making of threads, filaments, strips, or films.

According to this invention a solution of a cellulose ester (such, for example, as cellulose acetate, nitro-cellulose acetate, or nitrocellulose) in a suitable volatile organic solvent (or mixture of such solvents) is projected through suitably shaped orifices, or is otherwise introduced, into a saponifiable animal, or vegetable, oil such, for example, as castor oil, or linseed oil, or a mixture of such oils. On so proceeding the cellulose ester is rapidly precipitated in a homogeneous and transparent condition. The ester can then be freed from any excess of oil in any suitable manner. Films, or strips, produced by this process are very clear and strong and are pliable. If the product be in the form of fine threads, or filaments, of artificial silk the said product is very soft and lustrous.

The ester may be dissolved in acetone, chloroform, methyl acetate, or any other suitable solvent, or mixture of suitable solvents, which is, or are, miscible with the oil, or oils, used for precipitating. The solvent, or solvents, can be readily recovered from the oil, or oils, by distillation, or by any other suitable means.

What we claim is:—

1. The manufacture of cellulosic products which comprises introducing a solution containing only cellulose ester and a solvent miscible with oil, into a setting bath comprising a saponifiable oil as the active setting agent.

2. The manufacture of cellulosic products which comprises introducing a solution containing only cellulose ester and a volatile organic solvent miscible with oil, into a setting bath comprising a saponifiable oil as the active setting agent.

3. The manufacture of cellulosic products which comprises introducing a solution containing only cellulose ester and a solvent miscible with oil, into a setting bath comprising a mixture of saponifiable oils as the active setting agent.

4. The manufacture of cellulosic products which comprises introducing a solution containing only cellulose ester and a solvent miscible with oil, into a setting bath comprising a saponifiable oil as the active setting agent, and thereafter freeing the product of excess oil.

5. The manufacture of cellulosic products which comprises introducing a solution containing only cellulose ester and a solvent miscible with oil, into a setting bath comprising a saponifiable oil as the active setting agent, and thereafter recovering the solvent from the setting bath.

In testimony whereof we have signed our names to this specification.

LOUIS CLÉMENT.
CLÉRY RIVIÈRE.